(12) United States Patent
Ramirez

(10) Patent No.: US 7,536,826 B2
(45) Date of Patent: May 26, 2009

(54) APPARATUS FOR DISPLAYING CULINARY, HORTICULTURAL OR FLORAL ITEMS

(76) Inventor: Steven W. Ramirez, 6 Lois La., Sharon, MA (US) 02067

( * ) Notice: Subject to any disclaimer, the term of this patent is extended or adjusted under 35 U.S.C. 154(b) by 481 days.

(21) Appl. No.: 10/524,100

(22) PCT Filed: Aug. 11, 2003

(86) PCT No.: PCT/US03/25068

§ 371 (c)(1),
(2), (4) Date: Sep. 2, 2005

(87) PCT Pub. No.: WO2004/014200

PCT Pub. Date: Feb. 19, 2004

(65) Prior Publication Data

US 2006/0010768 A1     Jan. 19, 2006

(51) Int. Cl.
*A01G 5/00* (2006.01)
(52) U.S. Cl. ...................... 47/41.01; 47/41.13
(58) Field of Classification Search ............ 47/39, 47/41.01, 41.1, 41.11, 41.12, 41.13, 41.14, 47/41.15; D11/146, 147; 248/27.8, 309.4, 248/175; D6/556; 24/5, 303; 428/24, 900
See application file for complete search history.

(56) References Cited

U.S. PATENT DOCUMENTS

| | | | |
|---|---|---|---|
| 649,874 A | 5/1900 | Payne |
| 928,213 A | 7/1909 | Patterson |
| 1,423,906 A | 7/1922 | Brettschneider |
| 1,631,631 A | 6/1927 | Gerlinger |
| 1,638,250 A | 8/1927 | Finlayson |
| 1,762,843 A | 6/1930 | Straub |
| 1,769,198 A | 7/1930 | Albany |
| 1,866,423 A | 7/1932 | Roberts |
| 1,892,393 A | 12/1932 | Halm |
| 2,003,101 A | 5/1935 | Asman |
| D97,712 S | 12/1935 | Orben |
| 2,029,643 A | 2/1936 | Sinclair |
| 2,047,321 A | 7/1936 | Hart |
| 2,151,192 A | 3/1939 | Crosser |
| 2,601,743 A | 7/1952 | Karsted |

(Continued)

FOREIGN PATENT DOCUMENTS

DE          3803589          8/1989

(Continued)

OTHER PUBLICATIONS http://www.dickblick.com, Dick Blick Art Materials, Wire Art Sculpture Kit, printed May 7, 2002, 2 pages.

(Continued)

*Primary Examiner*—Trinh T. Nguyen
(74) *Attorney, Agent, or Firm*—Wolf, Greenfield & Sacks, P.C.

(57) ABSTRACT

An apparatus (8) for displaying at least one of culinary, horticultural and floral item(s) allows the item to be easily attached to or removed from a variety of surfaces (10). The display includes a support (14) for supporting the arrangement. The support (14) may be made of reformable sculpting wire, allowing a user to form the wire in any desired shape. An interface (12), having magnetic properties, is constructed and arranged to mount the support (14) to a surface (10) that has either magnetic properties or non-magnetic properties.

19 Claims, 12 Drawing Sheets

U.S. PATENT DOCUMENTS

| | | | |
|---|---|---|---|
| 2,624,968 A | 1/1953 | Polizzi | |
| D188,384 S | 7/1960 | Messer | |
| 3,087,280 A | 4/1963 | Seliger | |
| D214,171 S | 5/1969 | Troutman | |
| 3,676,275 A | 7/1972 | Sloane | |
| 3,735,447 A * | 5/1973 | Abraham | 24/6 |
| 3,829,349 A | 8/1974 | Hermanson | |
| 3,857,747 A | 12/1974 | Bitecola | |
| 3,928,712 A | 12/1975 | Sears | |
| D248,842 S | 8/1978 | Ditto | |
| 4,171,754 A | 10/1979 | Rosado | |
| 4,173,843 A | 11/1979 | Marble | |
| 4,340,625 A | 7/1982 | Willinger | |
| 4,534,129 A | 8/1985 | Stuckey | |
| 4,600,612 A | 7/1986 | Litwin et al. | |
| 4,606,950 A | 8/1986 | Corbet | |
| D287,345 S | 12/1986 | McLaughlin | |
| D288,304 S | 2/1987 | Grun | |
| D291,072 S | 7/1987 | Hebert, Jr. | |
| 4,678,150 A | 7/1987 | Newman et al. | |
| 4,805,075 A | 2/1989 | Damore | |
| 4,950,509 A | 8/1990 | DeMott | |
| 5,063,485 A | 11/1991 | Harris | |
| 5,082,699 A | 1/1992 | Landau | |
| 5,120,583 A | 6/1992 | Garcia | |
| 5,127,184 A | 7/1992 | Cosentino | |
| D344,043 S | 2/1994 | Brookshire, Sr. | |
| D361,291 S | 8/1995 | Chavalas | |
| 5,508,070 A | 4/1996 | DiLapo et al. | |
| 5,570,863 A | 11/1996 | Cooper | |
| 5,677,018 A | 10/1997 | Shin | |
| 5,682,648 A | 11/1997 | Miller | |
| 5,698,275 A | 12/1997 | Pompeo | |
| D390,157 S | 2/1998 | Burnett | |
| 5,759,645 A | 6/1998 | Li | |
| D401,886 S | 12/1998 | Burnett | |
| 5,935,054 A | 8/1999 | Loos | |
| 5,962,088 A | 10/1999 | Tanaka et al. | |
| 6,004,635 A | 12/1999 | Li | |
| 6,027,083 A | 2/2000 | Chang | |
| 6,038,812 A | 3/2000 | Belokin et al. | |
| 6,082,045 A | 7/2000 | Weder et al. | |
| 6,093,458 A | 7/2000 | Worchester | |
| 6,093,459 A | 7/2000 | Pulio, Jr. | |
| 6,149,119 A * | 11/2000 | O'Connell | 248/545 |
| D441,688 S | 5/2001 | Clarke | |
| 6,306,471 B1 | 10/2001 | Pitman et al. | |
| D453,910 S | 2/2002 | Jones, II | |
| 6,349,501 B1 | 2/2002 | Freeman | |
| 6,401,726 B1 | 6/2002 | Sonstegard | |

FOREIGN PATENT DOCUMENTS

| | | |
|---|---|---|
| EP | 0824885 A2 | 2/1998 |
| EP | 0824885 A3 | 12/1999 |
| EP | 1077047 A2 | 2/2001 |
| EP | 1077047 A3 | 10/2001 |
| FR | 1271112 A | 9/1961 |
| FR | 2614194 | 10/1988 |
| GB | 990705 A | 4/1965 |
| JP | 6-297900 | 10/1994 |
| JP | 9-407 A | 1/1997 |
| JP | 10-5091 | 1/1998 |
| JP | 10-64722 | 3/1998 |

OTHER PUBLICATIONS http://www.dickblick.com, Dick Blick Art Materials, Wire Art Mini-Kids Kit, printed May 7, 2002. 2 pages.

http://www.dickblick.com, Dick Blick Art Materials, Wire Art Project Kits, printed May 7, 2002, 2 pages.

http://www.hgtv.com, HGTV crafts & collectibles, Classic Wall Sconces, printed May 7, 2002, 2 pages.

http://www.sculptshop.com, Sculpture House Casting, 10" Animal Armature, printed May 7, 2002, 1 page.

http://www.sculptshop.com, Sculpture House Casting, 24" Heavy Duty Figure Armature, printed May 7, 2002, 1 page.

http://www.sculptshop.com, Sculpture House Casting, 20" Head Armature, printed May 7, 2002, 1 page.

http://www.dickblick.com, Dick Blick Art Materials, Wire Bending Jig, printed May 7, 2002, 2 pages.

http://www.dickblick.com Dick Blick Art Materials, Wire Art for Kids, printed May 7, 2002, 2 pages.

httpp://www.dickblick.com Dick Blick Art Materials, Sculpture House Wire Armatures with Bases, printed May 7, 2002, 2 pages.

http://www.sculptshop.com, Sculpture House Casting, Armatures, printed May 7, 2002, 2 pages.

http://www.sculptshop.com Sculpture House Casting, 18" Figure Armature, printed May 7, 2002, 1 page.

http://www.hgtv.com, HGTV Food & Lifestyle, Contemporary Wall Vase, printed May 7, 2002, 2 pages.

Amateur Competitions & Exhibitions Schedule & Information Book, New England Spring Flower Show, Shades of Spring, Mar. 16-24, 2002.

Enclosed Photo from New England Spring Flower Show 2001.

Judges' Comment Sheet and Ribbon, New England Spring Flower Show, Mar. 16, 2001.

Judges' Comment Sheet and Ribbon, New England Spring Flower Show, Mar. 15, 2002.

* cited by examiner

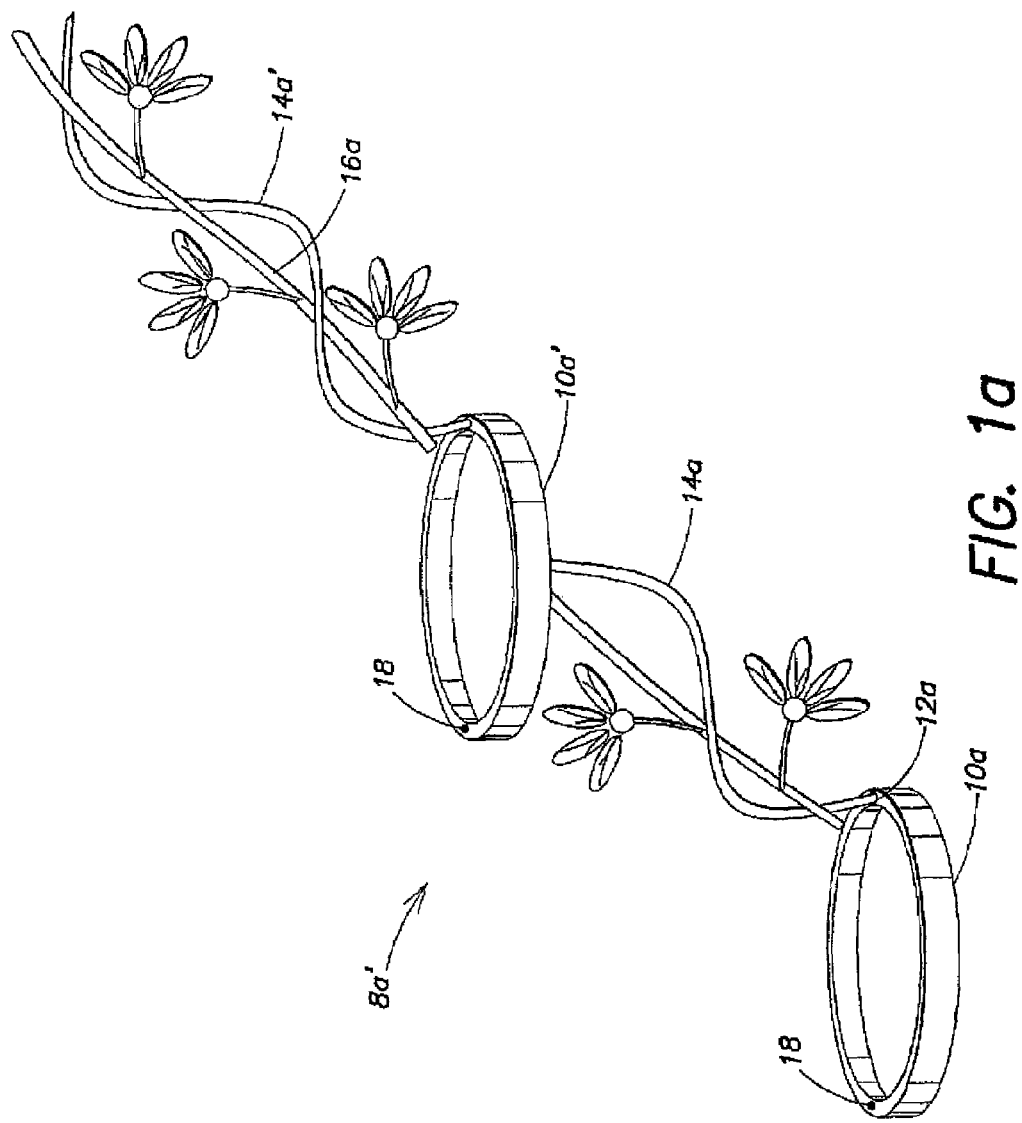

APPARATUS FOR DISPLAYING CULINARY, HORTICULTURAL OR FLORAL ITEMS

BACKGROUND OF THE INVENTION

1. Field of the Invention

The present invention relates to a display apparatus and, more particularly, to a display apparatus for displaying at least one of culinary, horticultural and floral arrangements.

2. Related Art

Current displaying techniques lack a means of easily and aesthetically attaching floral, horticultural or culinary arrangements to a desired surface, such as a serving platter, tray, bowl, or even a table in a manner that allows the arrangement to be reused with a different surface. In addition, it is difficult to elevate arrangements off the surface, especially arrangements that have significant size or weight. Other limitations arise, such as the inability to display arrangements on sculpted ice, without causing significant melting of the ice.

SUMMARY OF THE INVENTION

The display apparatus is for displaying at least one of culinary, horticultural and floral arrangements such that the arrangement can be easily attached to and removed from a variety of surfaces. The display apparatus may include a support, such as reformable wire, for holding the arrangement. The display apparatus also includes an interface to mount the support to the surface.

In one embodiment, a decorative display apparatus for displaying at least one of culinary, horticultural and floral items is disclosed. The apparatus includes a support for supporting the at least one of culinary, horticultural and floral items and an interface cooperating with the support. The interface has magnetic properties and is constructed and arranged to mount the support to a surface that has one of magnetic and non-magnetic properties.

In another embodiment, a decorative display apparatus for displaying at least one of culinary, horticultural and floral items is disclosed. The apparatus includes a base having magnetic properties, a support from engaging the at least one of culinary horticultural and floral items and an interface magnetically attracted to the base and attached to the support. The interface connects the support to the base.

In another embodiment, a decorative display apparatus for displaying at least one of culinary, horticultural and floral items on an ice sculpture is provided. The apparatus includes an interface adapted to attach to the ice sculpture. The interface includes an insulating material. A support is attached to the interface. The support includes an elongate sculpting wire having a first end, a second end and a length therebetween. The wire is adapted to be formed and reformed by a user into any desired shape. The wire is also adapted to support the at least on of culinary, horticultural and floral items in different orientations with respect to the wire.

In another embodiment, a system for displaying at least one of culinary, horticultural and floral items is disclosed. The system includes a support for supporting the at least one of culinary, horticultural and floral items and an interface attached to the support, with the interface having magnetic properties. The system also includes a plurality of rigid decorative bases. Each decorative base has magnetic properties to allow magnetic coupling of the interface to any one of the plurality of decorative bases. In this manner, a user may selectively couple the interface to a desired decorative base.

In yet another embodiment, a decorative display apparatus for displaying at least one of culinary, horticultural and floral items is disclosed. The apparatus includes a base and a support attached to the base. The support includes an elongated sculpting wire having a first end, a second end and a length therebetween. The wire is adapted to be formed and reformed by a user into any desired shape. The wire is also adapted to support the at least one of culinary, horticultural and floral items in any desired orientation and at any position on the wire.

In still another embodiment, an apparatus for displaying at least one of culinary, horticultural and floral items is disclosed. The apparatus includes a base and a reformable wire-like support attached to the base for engaging one or more of the items. The support is capable of displaying the item or items in a variety of different positions with respect to the base.

Various embodiments of the present invention provide certain advantages and overcome certain limitations of prior culinary, horticultural or floral display apparatuses. Embodiments of the invention may not share the same advantages, and those that do may not share them under all circumstances. Further, the elements described herein may be arranged in any suitable combination, as the present invention is not limited in this respect.

BRIEF DESCRIPTION OF THE DRAWINGS

Various embodiments of the invention will now be described, by way of example, with reference to the accompanying drawings, in which.

DETAILED DESCRIPTION

The display apparatus of the present invention enables culinary, horticultural and/or floral arrangement to be easily attached to and removed from a variety of surfaces. The display apparatus includes a support for holding the arrangement, which may be made of reformable sculpting wire, allowing a user to form the wire in any desired shape. The device includes an interface enabling the support to be attached to the surface. The interface is constructed and arranged to accommodate the type of surface to which the display apparatus will be attached. For example, if the surface is made of a material having a high magnetic susceptibility, such as stainless steel, then the interface may include a magnet. If the surface is formed of a non-magnetic material or a material that has a very low magnetic susceptibility, such as textile, ceramic, glass, wood, ice, etc., then the interface may include a magnet and a magnetically attractable member (which itself may be a magnet) that can couple through the non-magnetic surface. If the surface includes ice, such as an ice sculpture, the interface may include an insulating material. The foregoing features of the display apparatus may be employed alone or in any suitable combination.

Figure 1:
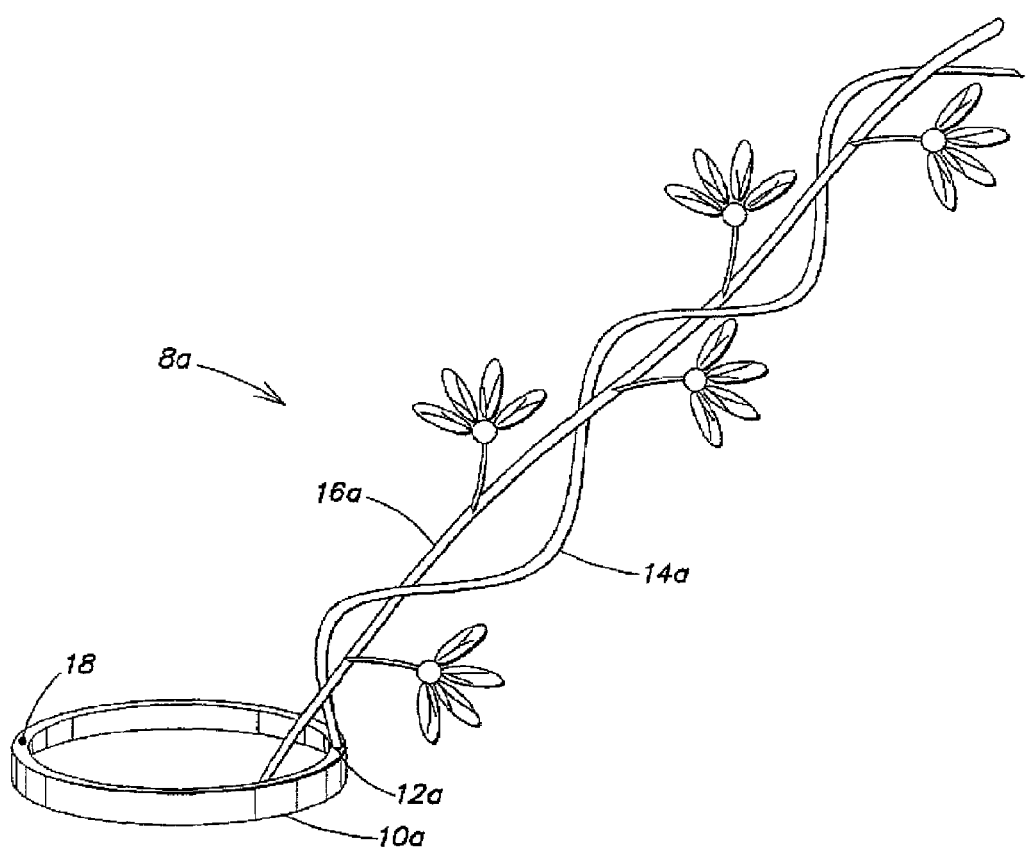
FIGS. 1-8*a* are views of different embodiments of the invention.

In one embodiment, depicted in FIG. 1, a display apparatus (8*a*) for a floral item (16*a*) is shown. In this embodiment, display apparatus (8*a*) is constructed to attach to a surface, such as base (10*a*) formed as a bottle holder or a wine coaster. The display includes an interface (12*a*), formed as a socket in the surface, and a support (14*a*), formed as a reformable wire. The wire (14*a*) supports the floral item by wrapping around it, as shown. Other suitable arrangements or configurations for supporting the item may be employed, as the present invention is not limited in this respect. In this respect, although the wire is shown as being wrapped around the item, the wire may be shaped or configured by a user to engage the item in any desired manner.

Figure 2:
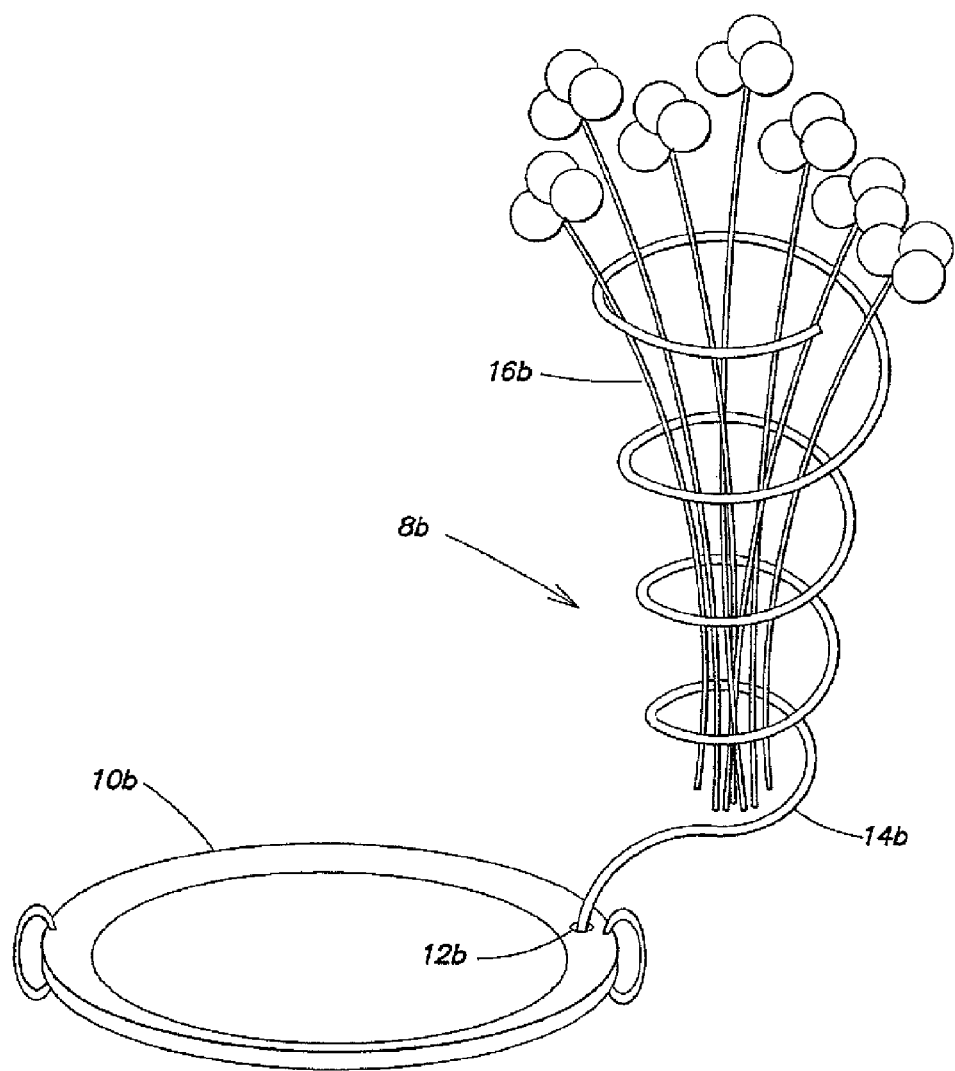

It should be appreciated that, as in FIG. 2, the support may support a plurality of items (16b). The support (14a) may be removably inserted into the interface (12a) in the base (10a). The socket (12a), while depicted on the upper surface (18) of the bottle holder (10a), may be on any surface of the base (10a). It should be further appreciated that the base (10a) need not be a bottle holder and may be any object that can accommodate the interface (12a) for the support (14a), as described in greater detail below. The base may be a vase, a wine coaster (as in FIG. 1), a serving platter, a tray, a stand, a pedestal, a table top, a plug or any other object. As seen in FIG. 2, the base comprises a serving platter (10b).

Figure 6:
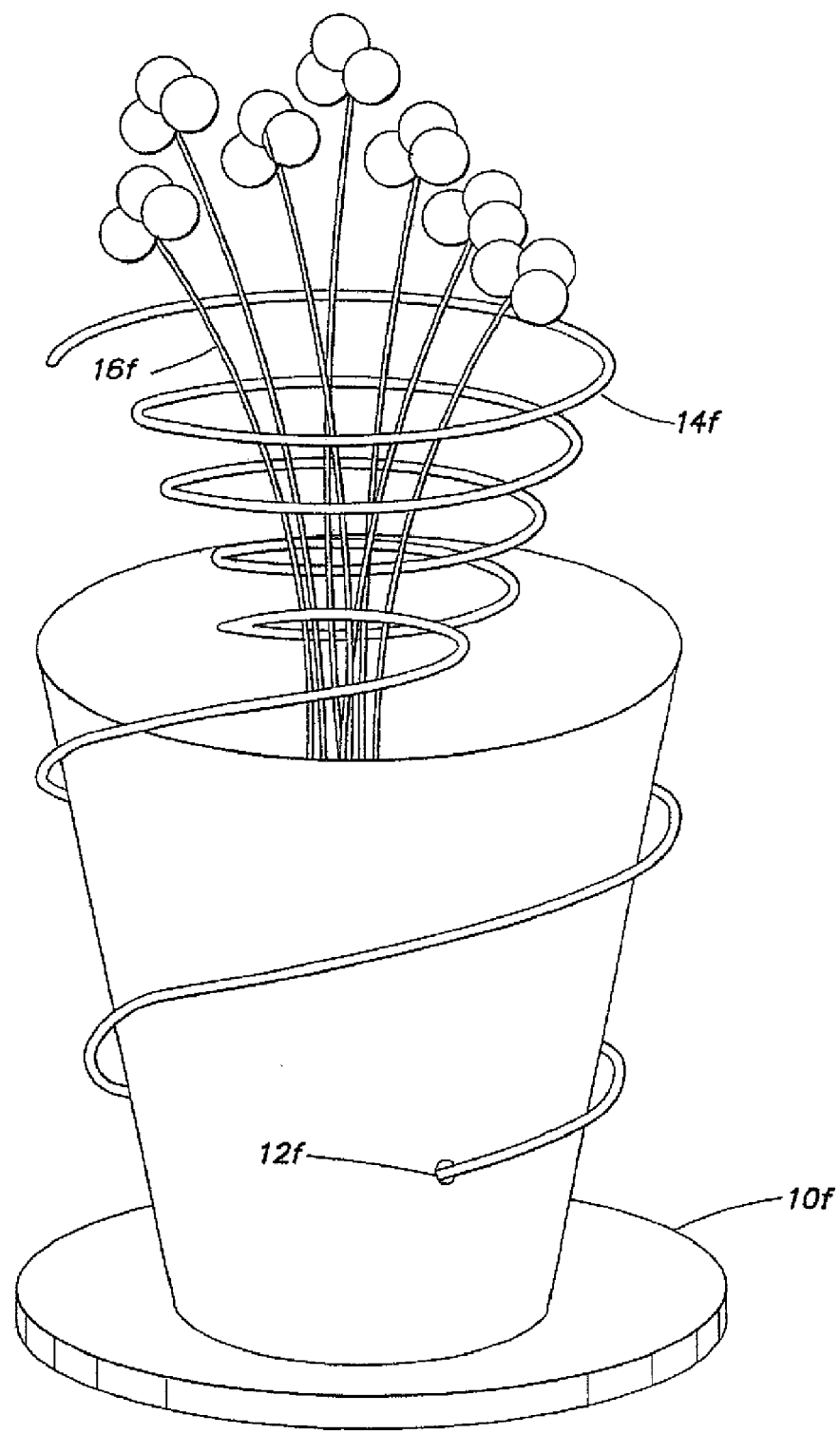

As shown in FIGS. 1, 2 and 6, the interface comprises a socket (12a, b and f, respectively) in the base into which the support may be inserted. Preferably, the support should snugly fit into the interface, such that the support will be securely held. Although in the embodiment described with reference to FIGS. 1, 2 and 6, the interface comprises a socket, the invention is not limited in this respect, as other suitable interfaces may be employed. For example, as will be discussed further below, the interface includes a magnet, a clip, an adhesive, a clamp, or any other means of attachment that would enable a support to be attached to a base.

Figure 3:
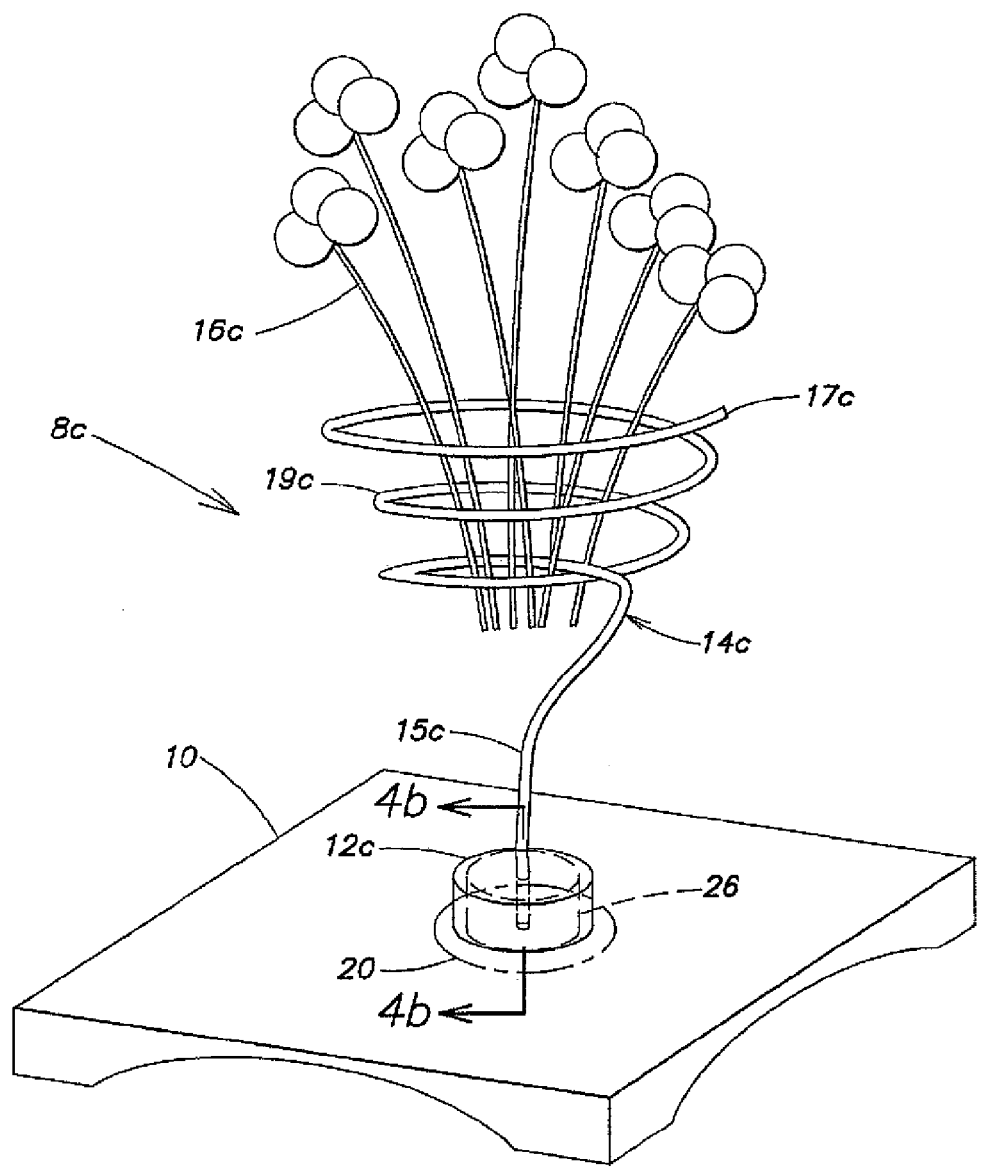

In one embodiment, the support (14a) may be a sculpting and/or reformable wire, such as an aluminum armature wire. The use of wire enables one or more floral, horticultural or culinary items to be elevated or otherwise offset from the base. The use of reformable wire also allows a user to shape the support in any fashion. The wire may be made from any material such as metal (e.g., aluminum or copper) and may have any length and diameter. As best shown in FIG. 3, the wire includes a first, proximal end (15c), a second, distal end (17c) and a length of wire (19c) therebetween. A portion of the wire may be unadorned, painted, anodized, twisted, or aesthetically decorated in any way.

As mentioned, the wire may be reformable by a user, allowing it to be used and re-used, and shaped into any desired shape. The reformability of the wire also enables the wire to support many differently sized or shaped item(s), both mechanically and aesthetically. The wire may take any shape and may be curled, wrapped, circled, angled, linear or any other configuration. In addition or in the alternative, as shown in FIG. 1a, the wire (14a') may be formed so that it can support a second base (10a') that in turn may support additional or the same the item(s) (16). The support may also be shaped to support multiple items spaced along the length of the support. The support may support a liquid absorbing foam material, such as Oasis® brand floral foam, available from Smithers-Oasis Company, Kent, Ohio, USA. The foam material may then be used to hold cut flowers or other items, as desired.

It should be appreciated that the reformable nature of the wire enables a user to bend the wire into any shape to assist in transportation of the floral, horticultural or culinary item. For example, a user may form an end of the wire into a hook, such that the wire may hang from a rod or a rack, while simultaneously supporting the item. In another embodiment, a user may initially form the wire with extra length so that the hook may be removed after transport is completed.

The wire support need not be reformable, as the present invention is not so limited. In this respect, the support may be formed as a relatively rigid wire such as non-malleable (or less malleable) aluminum, steel or wrought iron. Such a support may be pre-shaped and a plurality may be supplied to allow a user to select a certain design to couple with the interface and/or the surface to which the display device will be mounted. In addition, such a support may serve as a surface to which another display device may be mounted, as in the embodiment described with reference to FIG. 1a.

In another embodiment, and as seen in FIGS. 3, 4, 4a and 4b, the support (14c,d) is attached to a surface (10) by magnetic means. In the depicted embodiments, the support (14c, d) is attached to an interface (12c,d) that has magnetic properties, enabling the interface (12c,d) to magnetically couple to the base (10), as will now be explained.

As used herein, "magnet" or "magnetically attractable" or "magnetic properties" means having a relatively high magnetic susceptibility whereas "non-magnetic" means having a relatively low magnetic susceptibility.

In FIG. 3, the base (10) is a stand or pedestal wherein at least a portion (20) of the base has magnetic properties. In this example, the base is formed of a magnetically attractable material and the interface (12c) includes a magnet (26) enabling magnetic coupling between the interface (12c) and the portion (20) of the base. It should be appreciated, that the base may include the magnet and the interface be formed of a magnetically attractable material, as the present invention is not limited in this respect.

Figure 4:
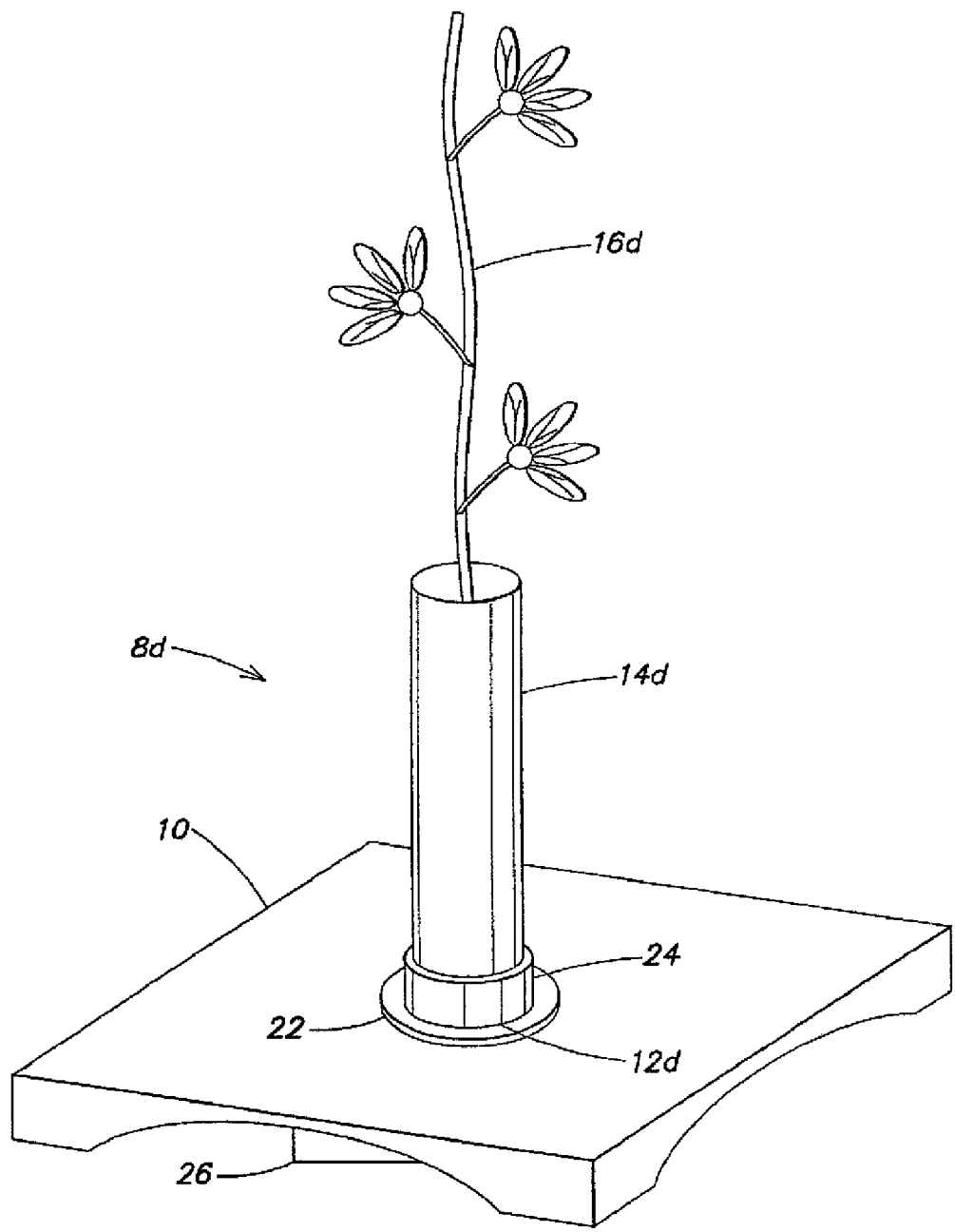
Figure 4A:
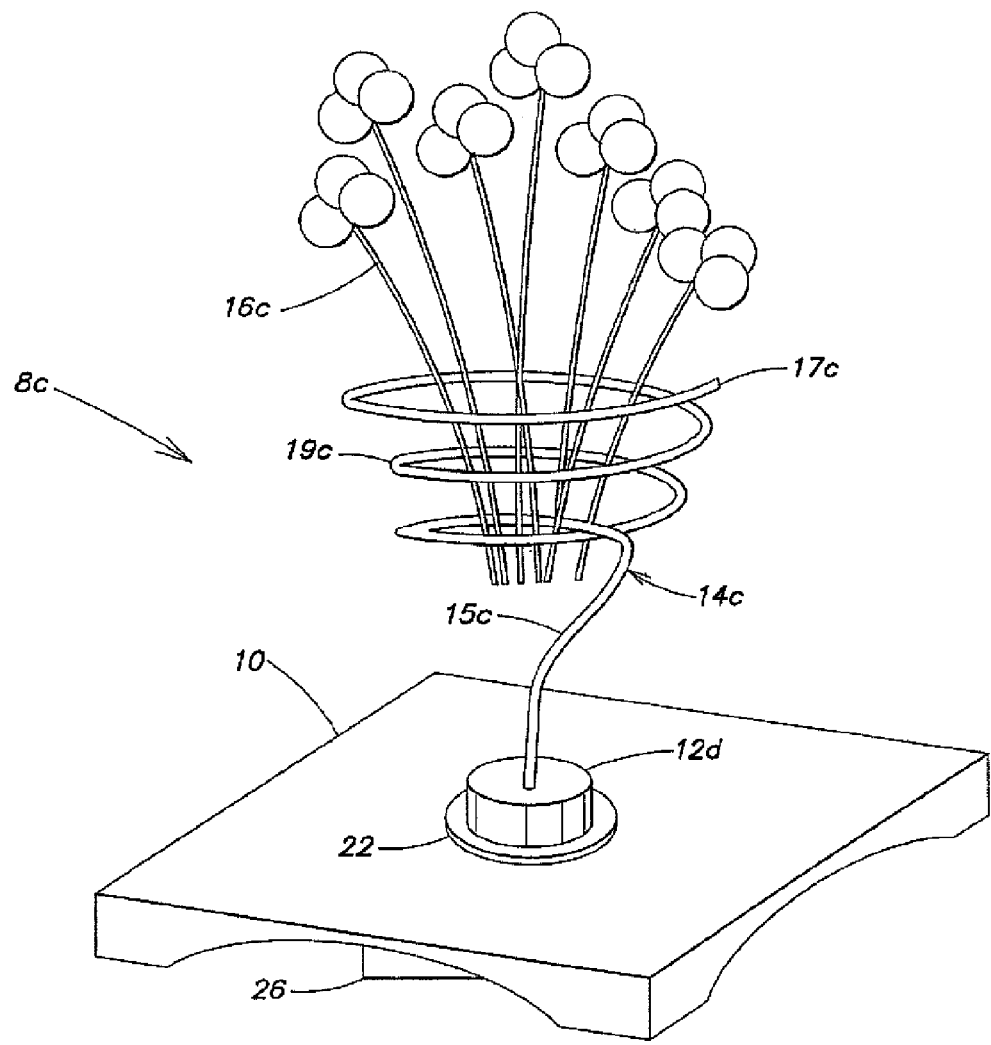

In FIG. 3, the surface (e.g., base (10)) itself has magnetic or magnetically attractable properties. As described above, the display apparatus may be attached to surfaces that do not have magnetic properties. Thus, as shown in FIGS. 4 and 4a, the interface (12d) includes a magnetically attractable member (22) and a magnet (26). The interface is therefore mountable to the non-magnetic surface (base (10)) by sandwiching the base (10) between the magnetically attractable member (22) positioned above the base (10) and the magnet (26) positioned below the base (10). Of course, the present invention is not limited in this respect, and as the magnet (26) may be positioned above the base (10) and attached to the support (14) and the magnetically attractable member (22) may be positioned below the base (10).

The magnetically attractable member (22) may be formed as a stainless steel disc. Other suitable magnetically attractable materials (such as chrome-plated steel) and other suitable shapes may be employed as the present invention is not limited in this respect. In addition, the magnetically attractable member (22) itself may be formed of a magnet.

It should be noted that in certain embodiments, the attraction between the magnet and magnetically attractable material should be strong enough to extend through the surface (10) and may depend upon the size, shape and weight of the item (16) to be supported. The magnet may be formed in any desired shape and from any suitable material and may be formed as a permanent magnet. In one embodiment, a high-energy rare earth Neodymium magnet is used. In another embodiment, a Samarium Cobalt magnet is used. In addition, the magnet may be formed to exert any desired force. In one embodiment, the magnet exerts a force in the range of 50 lbs-100 lbs; in another embodiment, the magnet exerts a force in the range of 100 lbs-200 lbs; in another embodiment, the magnet exerts a force in the range of 125 lbs-250 lbs; in yet another embodiment, the magnet exerts a force in the range of 175 lbs-300 lbs or more. Other suitable ranges may be employed, as the present invention is not limited in this respect.

One advantage of utilizing a magnetic connection is that the surface is not permanently altered. In this embodiment, the magnet (26) is removably positioned underneath the surface such that when the magnetically attractable member (22) is placed on top of the surface, magnetic forces draw the magnetically attractable member (22) to the surface such that the stand (10d) is sandwiched between the first portion (12d)

and the second portion (26). However, the magnet (26) or magnetically attractable member (22) may be permanently attached to the surface.

It should be appreciated that the interface may include a separate magnet or magnetically attractable member (26) (as shown in FIG. 4) fixedly or removably disposed on, in, or around the base. Alternatively, the magnetic capabilities may be integrally incorporated with the base or may comprise a coating around or on the base. Further, the entire base may have magnetic properties. The magnet or magnetically attractable member (26), if used, may have any shape and thickness. In one embodiment, the magnetic properties of the base and/or interface, whether integral with the base or provided by a separate magnet or magnetically attractable member, may be aesthetically pleasing and be visible or be substantially out of sight. For example, as shown in FIG. 4c, which is a cross-section taken along line 4b-4b of FIG. 3, the interface 12 includes a cover 13, with the magnet 26 housed beneath the cover.

Similarly, the interface may be part of the reformable wire, as the present invention is not limited in this respect. In this respect, a portion of the wire may be formed from a magnetic material or may be otherwise coated with magnetic particles. Also, the magnetic material may be disposed within the wire.

Figure 4B:
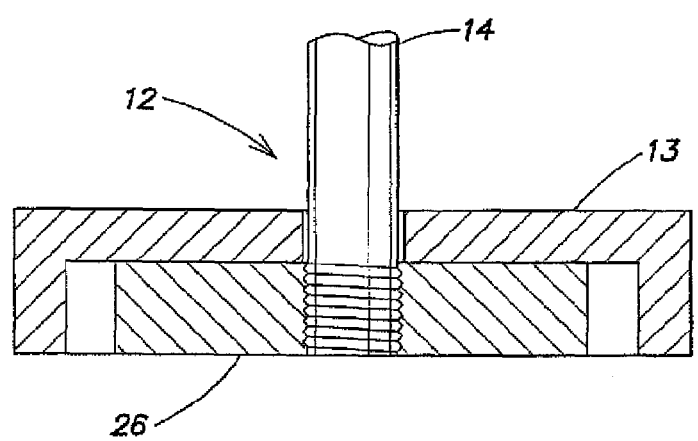

In the embodiment of FIG. 3, the support (14c), comprising a reformable wire, is inserted into the interface (12c). It should be appreciated, that the wire may be attached to the interface in any suitable manner, such as wrapping around the interface, welding, interference fitting, clamping, threading, or any other means of securement. In one embodiment, as shown in FIG. 4b, the cover 13 of the interface 12 includes a threaded hole to receive a threaded end of the support 14.

Figure 7:
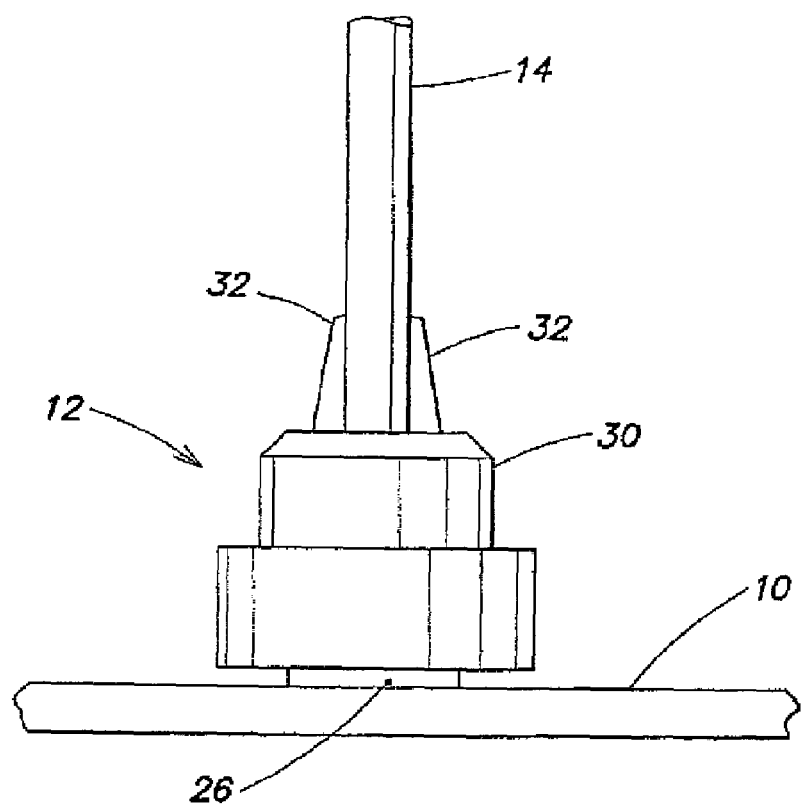
Figure 7A:
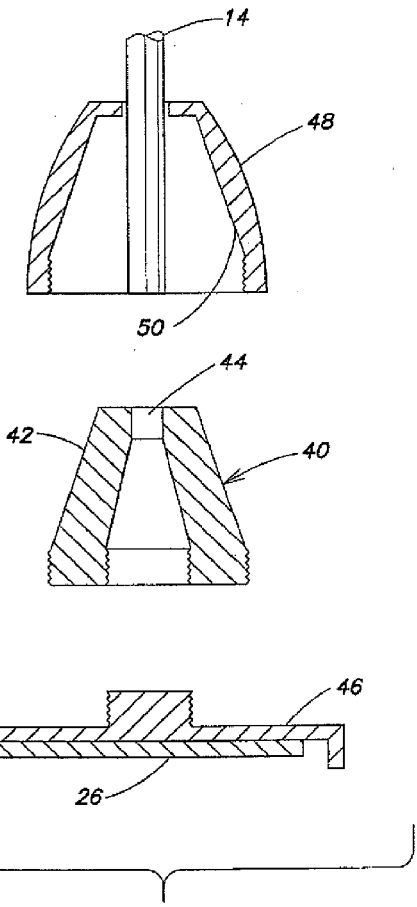

In another embodiment, as shown in FIGS. 7 and 7a, the interface (12) may include a releasable clamp or collet (30), such as a collet employed as a drill chuck, that may be adjusted to clamp the support (14). The collet (30) may include any number of leaves (32), such as two, three, four, five, six or more. In this embodiment, an outer sleeve of the collet is rotated to draw the leaves toward the wire, thereby clamping the wire. As in the previously described embodiments, the interface (12) may comprise a magnetically attractable element or magnet as well as the collet. For example, the interface (12) may include a collet (30) for clamping the wire (14) and a magnet (26) for magnetically coupling to the surface (10) or magnetically attractable member (22); the magnet being attached to the bottom of the collet (30).

In the embodiment shown in FIG. 7a, which is an exploded, cross-sectional view of an alternative clamp, a collet (40) is formed with a plurality of cantilevered leaves (42) centered about an opening (44) adapted to receive the wire (14). As with the embodiment described with respect to FIG. 7, the collet (40) may be secured to the magnet (26). In one embodiment, the collet (40) is secured to a magnet cover (46), to which the magnet (26) is attached by, for example, adhesively bonding. The interface further includes a collet cap (48) having a tapered internal surface (50) that can screw onto the collet (40), as show, or onto the magnet cover (46). As the collet cap (48) is screwed or otherwise draw onto collet (40), the tapered surface (50) of the collet cap push the leaves (42) inward, thereby causing the collet (40) to clamp onto the wire (14). In one embodiment, the collet (40) is sized to accommodate the diameter of the wire to be clamped. As such, in this embodiment, the collet (40) is removably attached to the magnet cap (46) allowing a user to select and attach a collet that is sized for the desired wire to the magnet cap. The collet (40) may be attached to the magnet cap in any suitable fashion as the present invention is not limited in this respect. In one embodiment, the collet (40) is screwed onto the magnet cap (46).

Unlike the previous embodiments wherein the support comprises a wire, in FIG. 4, the support comprises a glass bud vase (14d). The bud vase (14d) is inserted into the interface (12d). In this embodiment, the interface (12d) may comprise a metallic disk (22) having either magnetic or magnetically attractable properties. A cup (24), which may be formed of metal, for holding the bud vase (14d), having either magnetically attractable or magnetic properties, respectively, extends from the interface. It should be appreciated, that the bud vase (14d) need not comprise glass and may be made from plastic, ceramic, metal, or any other material. In addition, the support need not be a bud vase (14d) and may be any type of holder, such as a test tube or watering tube. Further, any suitable support, such as the reformable wire, may be used in place of the bud vase and cup.

It should be further appreciated that the interface (12d) need not include a cup (24) into which the support (14d) inserts. Depending upon the shape and orientation of the support, the interface may be shaped and attached in a variety of ways. If the support is a bud vase or holder, the interface may wrap around the support, be fixedly or removably disposed in or around the support or be attached via any other means of attachment.

To reduce the possibility of the interface marring the surface (10) to which the display apparatus will be mounted, a barrier material, such as paper, felt, textile, plastic, etc. may be placed on the surface (10) or on the underside of the interface (12). The barrier material may be attached to the surface (10) or to the interface (12). In one embodiment, the barrier material is formed of plastic film and may be formed with an inherent stickiness to allow it to attach to the surface. Alternatively, such a plastic film may be attracted to the surface or the interface through static electricity. In yet another alternative, an adhesive may be used to secure the barrier to the surface or interface. If attached to the surface (10) and if an adhesive is used, the adhesive may have a relatively low sticking quality, thereby allowing easy removal of the barrier from the surface (10) once the display is no longer mounted to the surface. In addition, the barrier material may include a relatively high friction surface (or inherent stickiness) to reduce the likelihood of the interface slipping along the surface (10). The barrier may also be sized and configured to act as a spacer to reduce the magnet attraction force between the interface and the surface should the magnet force otherwise be too strong. The barrier material may also be disposable.

Figure 8:
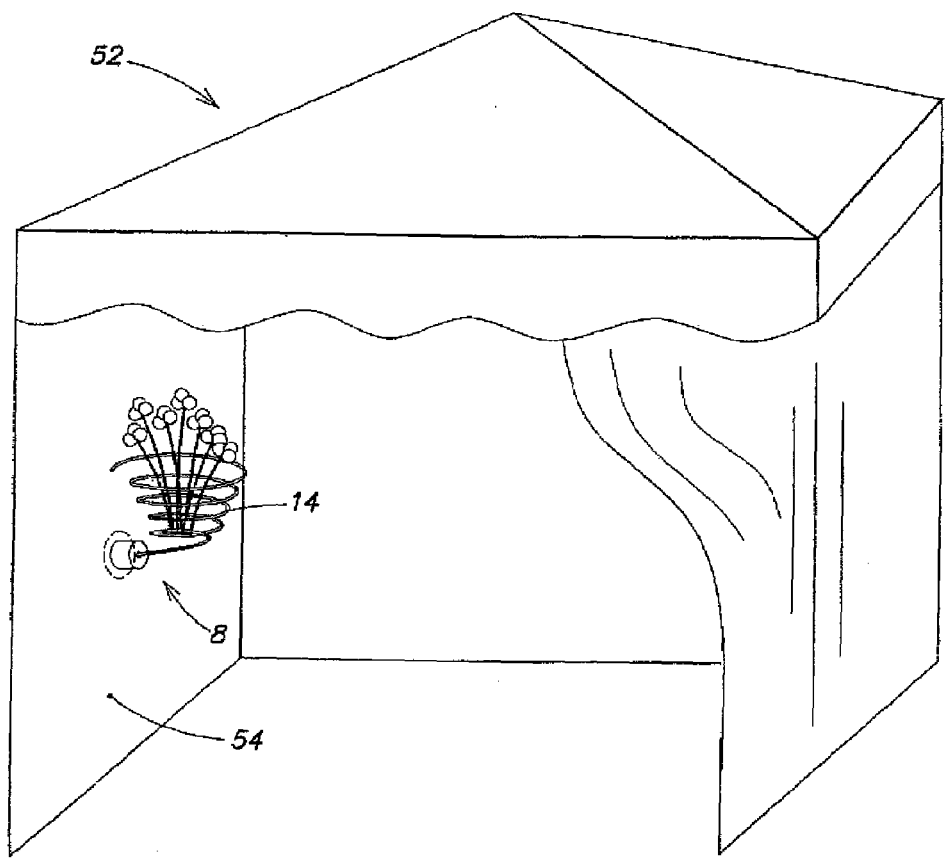
Figure 8A:
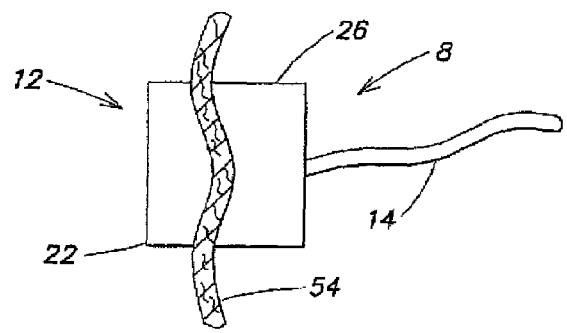

In one embodiment, as shown in FIGS. 8 and 8a, the interface may be configured to mount the support (14) to a non-magnetic surface, such as a textile wall (40) of a tent (42), which may be typically found at an outdoor catered event. In this respect, the interface (12) having a magnet (26) and a magnetically attractable member (22) (which, as described above, may be a magnet) is used to mount the support (14) by sandwiching the tent wall (40) between the magnet (26) and magnetically attractable member (22).

In an alternative embodiment, the tent wall itself may have a magnet or magnetically attractable member sewn in or otherwise attached to the tent, thereby rendering a portion of the tent wall with magnetic properties. The interface, having a magnet (or magnetically attractable member if a magnet is attached to the tent), may then simply couple to that portion of the tent.

Similarly, the interface may be configured to mount the support (14) to a non-magnetic wall, such as a wood or a gypsum wall. In this example, a magnet or magnetically attractable member is embedded in or otherwise attached to such a wall, and an interface, having magnetic properties couples to the magnet or magnetically attractable member to mount the support to the wall.

Figure 5:
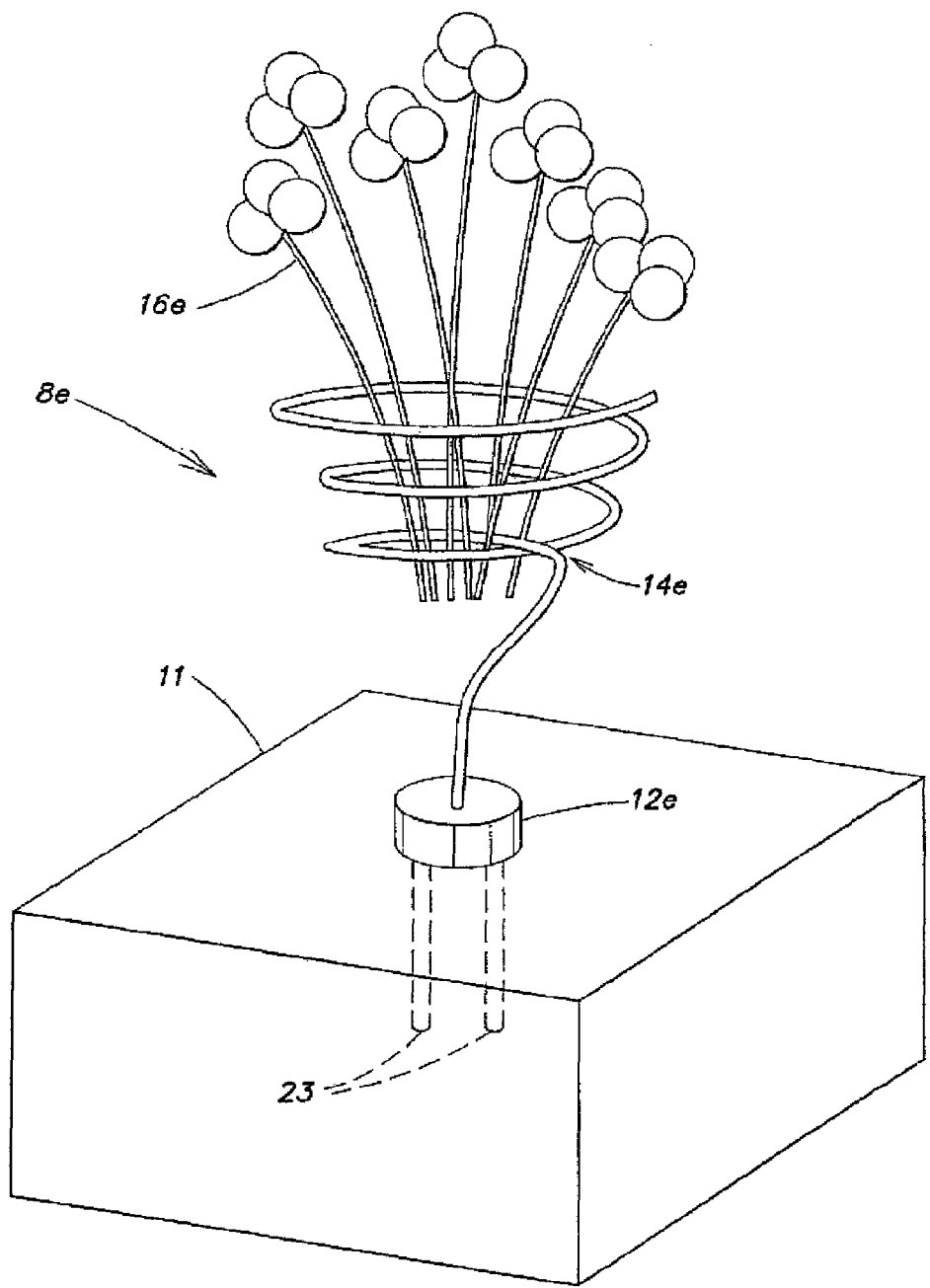

Turning to FIG. 5, the device (8e) is configured to attach to ice (11). In this embodiment, the interface (12e) further includes a heat insulating member. It should be appreciated that the ice block (11) depicted is intended to represent any shape and dimension of ice sculpture, as the invention is not meant to be limiting in this respect. This embodiment enables a support made of a heat conducting material to be connected to the ice without inducing melting. Examples of insulating materials include wood, plastic, rubber, foam, fiberglass or any other material that is thermally insulating. In this embodiment, the insulating portion of the interface (12e) comprises a wood cylinder into which the support (14e) is inserted or otherwise attached. As in the previous description, the way in which the support is attached to the insulating portion of the interface is not intended to be limiting and may include any attachment means, such as, insertion, adhesion, wrapping, threading, clamping, or even magnetic coupling. In this respect, the insulating portion of the interface may include a magnet and a magnetically attractable member may be attached to the support. Alternatively, the insulating portion of the interface may include a magnetically attractable member and a magnet may be attached to the support. Further, both the insulating portion of the interface and the support may include a magnet.

To facilitate positioning of the insulating portion of the interface (12e) in the ice, a pair of pegs (23) may be attached thereto. The pegs (23) may also be made from an insulating material. In a preferred embodiment, the pegs (23) are cylindrical in shape. In this manner, the ice may be drilled and the pegs inserted into the drilled holes. The pegs (23) may be formed as a non-cylindrical shape, such as rectangular, triangular or other geometrical configurations. Among the advantages of using non-cylindrically-shaped pegs is the ability of the interface to resist rotation in a like-shaped hole. Of course, the use of a pair of pegs also restricts rotation.

In FIG. 5, two cylindrically-shaped wooden pegs (23) are shown. It should be appreciated that any number of pegs (23) may extend from the interface and may extend in any direction.

FIG. 6 depicts a vase (10f), from which a reformable wire (14f) extends. The vase (10f), acting as the base, has a socket (12f) in its side. This socket (12f) acts as the interface and from it, the support (14f) extends. In this embodiment, the support (14) has both aesthetic and mechanical functions. Mechanically, the support, formed as a wire, enables a user to form the wire in any desired shape and to securely hold an arrangement of item(s) (16f) in any desired orientation. Aesthetically, the wire (14f) may decorate the vase (10f) and acts as a cohesive element between the item(s) (16f) and the vase (10f) itself. Also, the reformable wire (14f) enables a user to use this vase (10f) with a variety of different arrangements of item(s).

In addition to the reusability and reconfigurability of the wire for different arrangements, various bases, interfaces and supports as described above, may be used interchangeably with one another. This system enables a choice among multiple bases to be used to support a single arrangement of item(s). For example, the wire (14a) containing one arrangement of item(s) (16a) in FIG. 1, may be removed from the bottle holder (10a) and reinserted into a serving tray (10b) of FIG. 2.

The supports (14c,d) may be removed from the interfaces (12c,d) and replaced with another support. For example, with respect to FIG. 4, if the bud vase (14d) is removably inserted into the cup (24) of the interface (12d), the bud vase (14d) can be removed and replaced with a different bud vase (14d) or support containing a different arrangement of items (16).

In addition or alternatively, the interfaces (12c,d) may be removed from the bases (10c,d). For example, in an embodiment where the support is fixedly attached to the interface, the interface itself may be removed and a new interface and support may be attached to the base.

With respect to the ice (11) in FIG. 5, interchangeable supports, interfaces and bases is also contemplated. For example, if the ice begins to melt, the interface (12e), support (14e) and item(s) (16e) may be removed and reinserted into another ice block or sculpture or other base. Additionally or alternatively, the support (14e) and item(s) (16e) may be removed from the interface (12e) and replaced by a different support and item(s) for display.

It should be further appreciated, that one base (10) may accommodate a plurality of interfaces and supports. For example, a serving platter may have two or more arrangements of item(s) in differing areas of the base. The present invention is designed to enable any number of interfaces and supports to be removably attached to any given surface.

It should be understood that the foregoing description of the invention is intended merely to be illustrative thereof and that other embodiments modifications and equivalents are within the scope of the invention recited in the claims appended hereto. Further, the elements described herein may be arranged in any suitable combination, as the present invention is not limited in this respect.

What is claimed is:

1. A decorative display apparatus for displaying at least one of culinary, horticultural and floral items comprising:
   a support for supporting the at least one of culinary, horticultural and floral items;
   an interface cooperating with the support, the interface having magnetic properties and being constructed and arranged to mount the support to a surface that has one of magnetic properties and non-magnetic properties;
   wherein the interface comprises a releasable clamp constructed and arranged to clamp onto the support; and
   wherein the support comprises an elongate sculpting wire having a first proximal end that is proximate the interface, a second distal end and a length therebetween, the wire being adapted to be formed and reformed by a user into any desired shape, the wire being adapted to support the at least one of culinary, horticultural and floral items in any desired orientation and at any position on the wire.

2. The display apparatus according to claim 1, wherein the interface is removably attached to the support.

3. The display apparatus according to claim 1, wherein the interface comprises a magnet attached to the support and constructed and arranged to mount the support to a surface that has magnetic properties.

4. The display apparatus according to claim 3, wherein the magnet is substantially hidden from sight.

5. The display apparatus according to claim 1, wherein the interface comprises a magnet and a magnetically attractable member that cooperate to mount the support to a surface having non-magnetic properties by sandwiching the surface between the magnet and the magnetically attractable member.

6. The display apparatus according to claim 5, wherein the magnetically attractable member comprises a magnet.

7. The display apparatus according to claim 5, wherein the magnetically attractable member comprises a metallic plate.

8. The display apparatus according to claim 1, wherein the wire is formed of malleable aluminum.

9. The display apparatus according to claim 1, wherein a portion of the wire proximate the second distal end is adapted to support the at least one of culinary, horticultural and floral items.

10. The display apparatus according to claim 1, wherein a portion of the wire is constructed and arranged to be wrapped around the at least one of culinary, horticultural and floral items.

11. The display apparatus according to claim 1, in combination with the at least one of culinary, horticultural and floral items.

12. The display apparatus according to claim 11, wherein the at least one of culinary, horticultural and floral items is held near the second distal end.

13. The display apparatus according to claim 1, in combination with the at least one of culinary, horticultural and floral items wherein the at least one of culinary, horticultural and floral items comprises a plurality of separate items, with at least one item being held at a position on the wire that is spaced from another item held on the wire.

14. The display apparatus according to claim 1, in combination with the at least one of culinary, horticultural and floral items wherein the wire further comprises an unadorned portion where neither the surface to which the apparatus is mounted nor the at least one of culinary, horticultural and floral items is attached.

15. The display apparatus according to claim 1, in combination with the surface.

16. The display apparatus according to claim 15, wherein the surface is selected from the group consisting essentially of a serving platter, a vase, a bottle holder, a bowl and a pedestal.

17. The display apparatus according to claim 15, wherein the surface comprises a magnet.

18. The display apparatus according to claim 15, wherein the surface has magnetic properties.

19. The display apparatus according to claim 15, further comprising a second surface, wherein the support is adapted to support the second surface.

* * * * *